No. 718,544. PATENTED JAN. 13, 1903.
E. R. STORM.
TELEGRAPH SYSTEM.
APPLICATION FILED JULY 30, 1897.
NO MODEL. 3 SHEETS—SHEET 1.
Fig. 1.
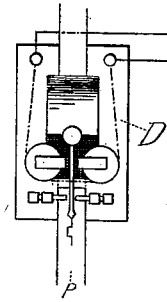
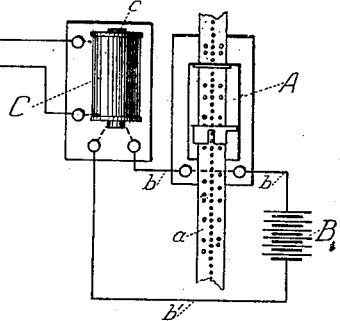
Fig. 2.
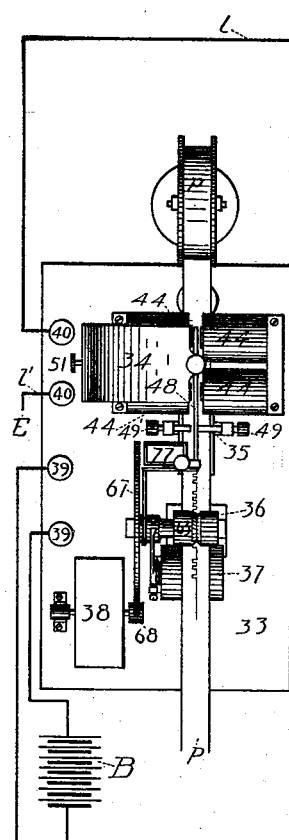
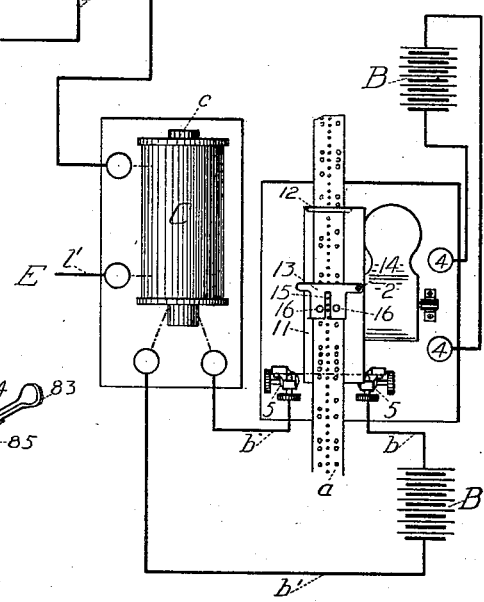
Fig. 13.
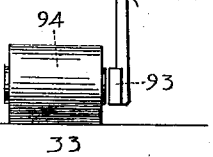
WITNESSES:
Percy Jacobs.
James Ramsey.
INVENTOR
Edwin R. Storm.

No. 718,544. PATENTED JAN. 13, 1903.
E. R. STORM.
TELEGRAPH SYSTEM.
APPLICATION FILED JULY 30, 1897.
NO MODEL. 3 SHEETS—SHEET 2.
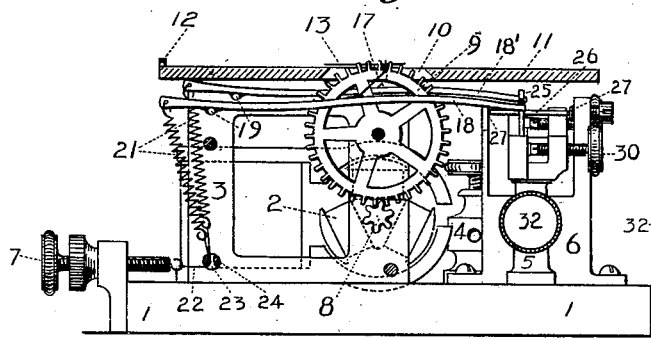
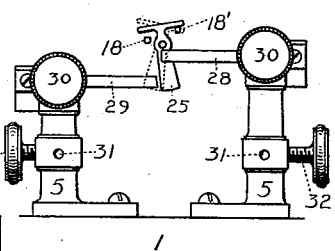
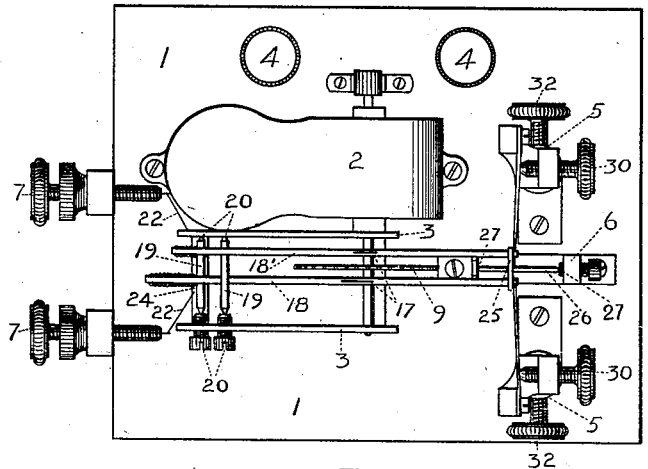
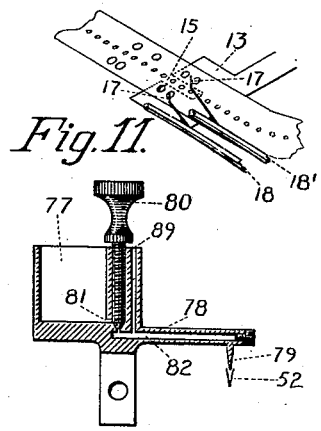
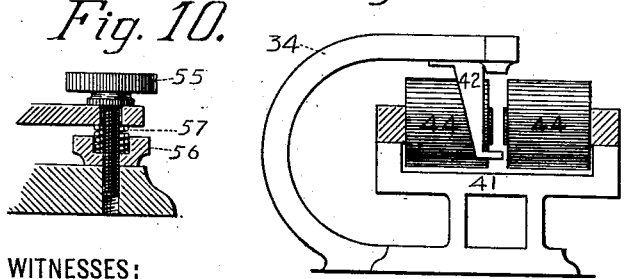
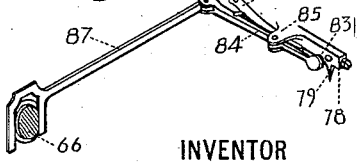
WITNESSES:
Percy Jacobs.
James Ramsey
INVENTOR
Edwin R. Storm.
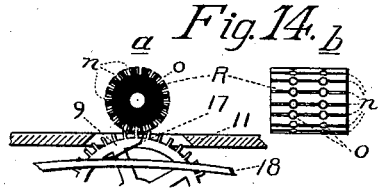

No. 718,544. PATENTED JAN. 13, 1903.
E. R. STORM.
TELEGRAPH SYSTEM.
APPLICATION FILED JULY 30, 1897.
NO MODEL. 3 SHEETS—SHEET 3.

WITNESSES:
Perry Jacobs.
James Ramsey

INVENTOR
Edwin R. Storm

UNITED STATES PATENT OFFICE.

EDWIN R. STORM, OF NEW YORK, N. Y.

TELEGRAPH SYSTEM.

SPECIFICATION forming part of Letters Patent No. 718,544, dated January 13, 1903.

Application filed July 30, 1897. Serial No. 646,450. (No model.)

*To all whom it may concern:*

Be it known that I, EDWIN R. STORM, a citizen of the United States, residing at New York, in the county of New York and State of New York, have invented a new and useful System for the Transmission of Telegraphic Messages, of which the following is a specification.

This invention relates to the transmission and recording of electrical impulses for telegraphic purposes in which such transmission is automatically accomplished through the aid of perforated strips and embraces in a system a transmitting and receiving instrument and in long distances may include one or more relays.

The objects of my invention are, first, to overcome or lessen the tendency existing in the present rapid systems of one character to merge into another; second, to provide a transmitter that will always send the same quantity of current to the line with a view to increase the number of impulses that may be carried by the line and be distinctly recorded; third, means for changing the polarity of the current with a minimum number of contact-points; fourth, a recording instrument making a distinct mark for the termination of each character. I attain these objects by the mechanism illustrated in the accompanying drawings, in which—

Figure 7:
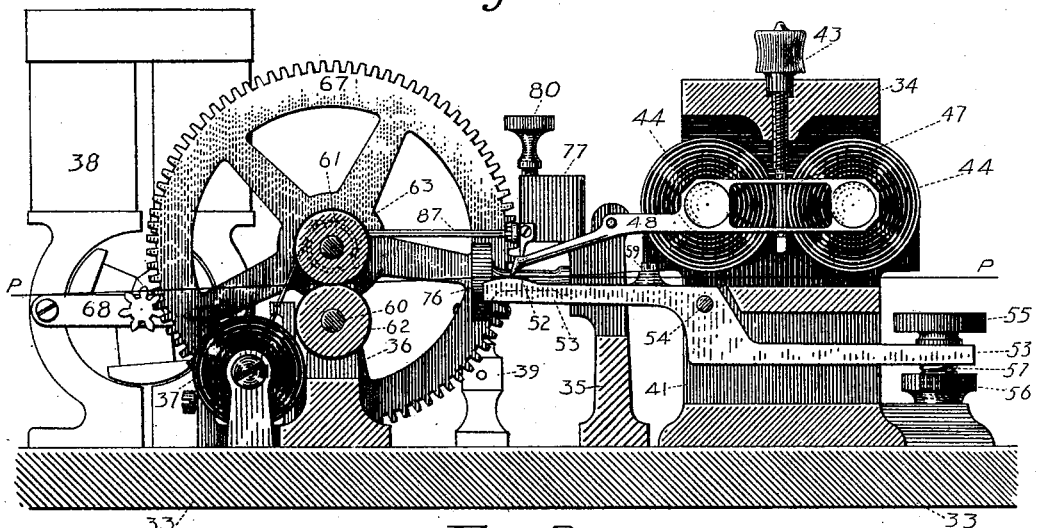
Figure 8:
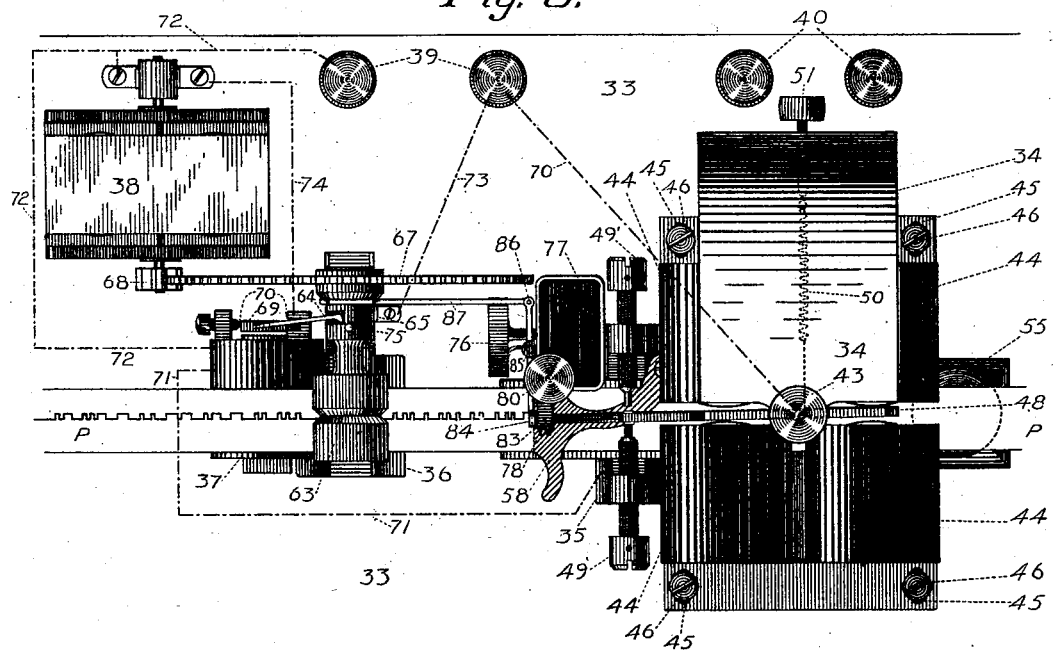

Figure 1 indicates the arrangement of the instruments used in the system. Fig. 2 is a diagrammatic view of the system, showing transmitting instruments, relay, and recording instrument. Fig. 3 is a side view of the transmitter with a portion of the frame and table-top removed. Fig. 4 is a plan view of the transmitter with the table-top removed. Fig. 5 is a detail showing the oscillating member 25 and the terminals 28 and 29 secured to their respective binding-posts. Fig. 6 is a detail showing the needle-points bearing against and engaging with the character-holes in the perforated strip and the leaf-spring holding the perforated strip to position. Fig. 7 is a side view of the receiving and recording instrument with a portion of the plate-piece 41 and the electromagnets attached thereto removed. A portion of the yoke-piece 35 and frame-piece 36 has also been removed. Fig. 8 is a plan view of the receiving and recording instrument. Fig. 9 is a side view of the permanent magnet, showing the plate-piece 41, magnets 44, and bearing-block 42 in their relative positions. Fig. 10 is a detail showing the adjusting-screw 55 with its lock-nut 56 and spring 57. Fig. 11 is a sectional view of the ink-well, showing the extended outlet and manner of conveying ink to the pen 52, also showing the controlling-valve and air-vent. Fig. 12 is a detail in perspective showing the eccentric 66, the connecting-rod 87, the lever 84 with its fulcrum 85, pad 83, and returning-spring 88, and the extended outlet 78 with the opening in the side thereof. Fig. 13 is a detail showing an alternative device for moving the lever 84. Fig. 14 is a detail showing an alternative device for holding the perforated strip in contact with the feed-wheel, and also for assisting the perforated strip in ejecting the needle-points.

The theory of this invention is based on the fact that if a current of electricity flows through a primary coil it will at the moment of its flow induce a momentary current in a secondary coil and also if the primary current be broken there will be induced in the secondary coil a momentary current of opposite polarity to the first induced current.

Referring to Fig. 1, A is a transmitter having means, which will be explained hereinafter, for making and breaking an electric current as the perforated strip $a$ is drawn through it. B is a galvanic battery supplying current through the conductors $b$ and $b'$. C is an induction-coil. D is a polarized relay having a pen affixed to the end of its vibrating arm. $l$ and $l'$ are line-wires. If now the perforated strip $a$ be drawn forward and the current be connected so it flows through the primary coil $c$ of the induction-coil C, a momentary current is set up in C, which flows through the wires $l\, l'$, magnetizing the electromagnets of the polarized relay D, which cause the vibrating arm to move from its position, the pen attached thereto making a transverse mark across the strip of paper $p$. If the strip $p$ be moved under the pen, it will receive a mark along its direction of movement. If now the perforated strip be moved until the current be broken, a second momentary impulse of opposite polarity to the first is induced in the coil C and flows through the wires $l\ l'$, changing the polarity of the electromagnets, and thereby returning the vibrating arm to its primary position, the pen making another transverse mark.

It will be noticed, first, that no direct current is sent to the line-wire, but only the induced current, and therefore a longer or shorter period of contact, allowing current to flow in the direct-current circuit, does not affect the length of impulse in the line-wire, since only the momentary currents induced in the secondary coil at the moment of flow of the direct current or of cessation of flow are sent to the line-wire. These momentary currents being equal and of opposite polarity, it follows that the same amount of current is sent to the line-wire at the beginning and end of each character and that longer and shorter marks representing dots and dashes would be formed by the time elapsing between the changes of polarity, when no current is flowing in the line-wire, though current will be flowing in the direct circuit of the local batteries.

I am aware of systems in which a normally straight line is used and marks are made on both sides of it. In one the marks indicating dots are disposed on one side and the marks indicating dashes on the other. In another system the succeeding characters are on opposite sides of an imaginary line, each character being distinguished by its length; but I am not aware of any system recording by a continuous line in which the longer and shorter character-marks are on the same side of the normally straight line.

In the transmitting instrument shown in Figs. 2, 3, 4, and 5, 1 is a base, to which are secured an electric motor 2, a frame 3, binding-posts 4 and 5, block 6, and tension-screws 7. The electric motor 2, receiving its current through the binding-posts 4, imparts its motion through the spur-wheel 8 to the feed-wheel 9, which, working through the slot 10 in the table-top 11, engages with the feed-holes in the perforated strip and moves it forward at a uniform rate. The guide 12 receives and directs the perforated strip to the feed-wheel 9, the strip being held in engagement therewith by the leaf-spring 13, fastened to the table-top at 14 and provided with the slot 15, through which works the feed-wheel 9 and the holes 16 to permit the free movement of the needle-points 17 of the levers 18 18'. Levers 18 18', formed as shown, are fastened to shafts 19, working in adjustable pivot-bearings 20 in frame 3, and are provided with tension-springs 21, attached, by means of the cord 22, passing through holes 23 in the stay-rod 24 of the frame 3, to the tension-screws 7. The levers 18 18' are adapted to work against the oscillating member 25, whose shaft 26 is adapted to work in the bearings 27 in the block 6. The oscillating member 25 is adapted to engage with the spring-terminals 28 29, which are fastened to the binding-posts 5, provided with the adjusting-screws 30, which press the spring-terminals toward the oscillating member 25 and permit of a delicate contact therewith. The binding-posts 5 are provided with the holes 31, which receive the battery-wires $b\ b'$, held therein by the binding-screws 32. The terminal 28 may be in constant engagement with the oscillating member 25, while the terminal 29 is only in engagement with it when the oscillating member is in the position indicated by the dotted lines, (see Fig. 5,) the terminals and the oscillating member forming a make and break. The needle-points 17, working through holes provided for them in the table-top 11, are held in contact with the perforated strip by the tension-springs 21 and are adapted to work up through the character-holes, permitting the levers 18 18' to work alternately against the oscillating member 25 and move it to either side. The needle-points and levers are returned to their original position by the strip; but as the levers are not connected to the oscillating member their return does not affect its position. The needle-points 17 are placed one slightly in advance of the other, (see Figs. 4 and 6,) so as when the character-holes are opposite to permit the lever 18 to rise first and move the oscillating member to one side, making contact with the terminal 29, as indicated by the dotted lines in Fig. 5, thus completing the circuit in the local battery B through the primary coil $c$, and then while the strip returns lever 18 to allow lever 18' to rise and move the oscillating member to the other side, breaking the contact with terminal 29 and interrupting the circuit, as shown in Fig. 5, which is the normal position of the oscillating member. The battery-wires $b\ b'$, held by the binding-posts 5, include in their circuit a primary coil $c$, placed inside a secondary coil C and insulated therefrom. The poles of the secondary coil are connected the one to the line-wire $l$ and the other, $l'$, to the earth. (See Fig. 2.) Each time the circuit through the local battery B is completed or interrupted by the oscillating member operated by the alternate movement of the levers 18 18', controlled by the character-holes in the perforated strip, a momentary current of alternately-opposite polarity is induced in the coil C and sent to the line-wire. By this means equal amounts of current of alternately-opposite polarity are sent to the line-wire at irregular intervals predetermined by the perforated strip.

At $a$ and $b$, Fig. 14, is shown an alternative device for holding the perforated strip in engagement with the feed-wheel 9 and assisting the strip to eject the needle-points 17, which consists of the roller R, having longitudinal channels $n$, adapted to mesh with the pins or teeth on the feed-wheel 9, and enlarged portions $o$ in these channels corresponding with the character-holes in the perforated strip adapted to receive the needle-points 17 and permit the levers 18 18' to operate. The web between these enlarged portions $o$, bearing against the needle-point 17, serves to eject or nearly eject the needle-point from the hole, the strip reinforced by the web completing the ejection.

In the transmitter shown I have adapted it to a perforated strip having a central line of feed-holes and character-holes on each side of the feed-holes; but I do not limit myself to this particular form, as it is evident the machine may be modified to suit other forms of perforated strips.

In the receiving and recording instrument shown in Figs. 7 and 8, 33 is a base to which is secured a permanent magnet 34, a yoke-piece 35, a frame-piece 36, an electromagnet 37, an electric motor 38, and binding-posts 39 40. The permanent magnet 34, formed as shown in Fig. 9, has secured to the pole forming the base a plate-piece 41 and to the other pole the bearing-block 42 and adjusting-screw 43. The plate-piece 41 is adapted to receive and hold the electromagnets 44, which, made adjustable by means of the elongated holes 45, are secured to position by the screws 46. The electromagnets are connected to the binding-posts 40, one of which is connected to earth, the other being connected to the line-wire, as shown in Fig. 2. The impulses in the line-wire therefore act on and magnetize the electromagnets, which are so disposed that the north pole of one is opposite the south pole of the other. The bearing-block 42 and adjusting-screw 43 have sockets to form bearings to receive the shaft 47 of the arm 48, which, being magnetized by the permanent magnet 34, is attracted and repelled by the electromagnets 44 in an arc limited by the screws 49 49' in the yoke-piece 35. The arm 48, which is normally against the screw 49, is provided with the tension-spring 50, connected at one end to the arm 48 and at the other to the adjusting-screw 51 in the permanent magnet 34. The tension-spring 50 is adapted to be adjusted to aid in the return of the arm to its normal position, but should not be sufficient to return the arm, which, being magnetized, remains where placed by the momentary impulse until a reversal of the current returns it to its normal position.

The arm 48 is provided with the pen 52, adapted to receive ink and make a mark upon the strip *p* upon the movement of either the pen or strip.

The arm 53, pivoted to the plate-piece 41 by the pin 54, is adapted to receive the strip *p* and hold it against the pen 52. A very delicate adjustment, avoiding friction, is secured by means of the adjusting-screw 55, which is provided with a lock-nut 56 and spring 57. (See Figs. 7 and 10.) The strip *p* is held to the formed end of arm 53 by the leaf-spring 58, fastened to the arm 53 by the screw 59. The frame-piece 36 is formed to receive the shafts 60 and 61, upon which are mounted the rollers 62 63, formed to grip and advance the strip *p* upon their rotation. The roller 63, provided with a groove to avoid contact with the ink, is extended, and formed, as shown in Fig. 8, to receive the contact-brushes 64 65, the eccentric 66, and the drive-wheel 67, which is rigidly mounted thereon and formed to mesh with the pinion 68 of the electric motor 38, whose circuit is normally broken.

The electromagnet 37 has its armature 69 mounted in bearings 70, extended to form the contact-brush 64, which is adapted to normally stand clear of the extension of roller 63, but to come in contact therewith upon the armature 69 being attracted to the electromagnet.

The binding-posts 39 are connected to the poles of a local battery B. (See Fig. 2.) From one of the binding-posts 39 is run a wire 70 to the permanent magnet 34, from which the current flows through the arm 48, and upon the arm 48 being moved out of its normal position against the screw 49' electric contact is formed, and the current flows from the arm 48 to the screw 49' through the yoke-piece 35 along the wire 71 into the electromagnet 37 and out along the wire 72 to the other binding-post 39, thus completing the circuit and magnetizing the electromagnet 37, which attracts the armature 69, causing the contact-brush 64 thereon to come in contact with the extension of roller 63, which is electrically connected to the binding-post 39 by the wire 73 and contact-brush 65, allowing the current to flow from the binding-post 39 along the wire 73 and contact-brush 65 through the extension of roller 63 to the contact-brush 64 along the wire 74, connected therewith, through the electric motor 38, along the wire 72, to the other binding-post, thus completing the circuit and causing the electric motor to revolve and rotate the rollers 62 63, advancing the strip, which receives marks from the pen 52, parallel to its movement when the pen remains stationary and transverse or nearly transverse to its movement when the pen is moved to either side by the electromagnets 44. The marks formed by the pen in its normal position constitute a zero-line, and the marks formed parallel to this zero-line constitute an intelligible record of the message received, the transverse lines serving to clearly mark the beginning and end of each separate character. The pin 75 engages with the formed end of contact-brush 64, returning it to its normal position, where it will remain if no current is flowing through the electromagnet 37, which will be the case if no further message is to be recorded, breaking the circuit of the motor and allowing the rollers to come to rest. The extended portion of the armature 69, forming the contact-brush 64, is a spring of sufficient power to overcome the residual magnetism of the magnet 37 when no current is flowing therein, but of sufficient elasticity to yield and allow the pin 75 to pass without separating the armature from the magnet when current is flowing therein.

To the yoke-piece 35 is secured, by means of the screw 76, the ink-well 77, which is formed with the projecting tube 78, terminating in the point 79, placed over the pen 52, as indicated in Fig. 11. The screw 80 forms, through the holes 81 and 82, a valve for controlling the flow of the ink. The outlet of the tube 78 is on the side, as indicated in Fig. 12, and is adapted to be closed by the cushion or pad 83, of cork, rubber, or other material, affixed to the end of the lever 84, which is pivoted at 85 to the ink-well 77 and connected by the joint 86 to the connecting-rod 87, which works on the eccentric 66 in such a manner that when the roller 64 is at rest in the position shown the eccentric 66 allows the spring 88 to press the pad 83 against the outlet and stop the flow of ink; but when the roller 63 is in motion during the greater part of each revolution the connecting-rod will be forced backward, causing the pad 83 to unstop the tube 78, permitting the ink to flow. The tube 78 is provided with the air-vent 89 to permit the tube to quickly discharge its contents and so charge the pen the moment the pad is removed.

At Fig. 13 is shown an alternative device for operating the lever 84 in place of eccentric 66 and connecting-rod 87, in which the lever 90, formed at 91 to engage with lever 84, is fulcrumed at 92 to the yoke-piece 35 and provided with the armature-piece 93 of the electromagnet 94, which is secured to the base 33. The electromagnet 94 is placed in the circuit of the motor 38, so that when a current flows through and operates the motor it also flows through the electromagnet 94 and causes it to attract the armature 93 and through the levers 90 and 84 to open the outlet in the tube 78, permitting the ink to flow and charge the pen. When the circuit to the motor is broken, the current ceases to flow through the electromagnet 94, the armature 93 is released, and spring 88 returns the lever 84, pressing the pad 83 against the outlet in the tube 78, preventing further flow of ink.

What I claim as my invention, and desire to secure by Letters Patent, is—

1. In a system of telegraphy, a transmitting instrument having levers operated by the movement of a perforated strip, means as a make-and-break controlled by the levers and an induction-coil whereby on the movement of the perforated strip electric impulses of like polarity, but of varying duration, are caused to induce momentary currents of alternately opposite polarity of equal duration but at irregular intervals.

2. In a system of telegraphy, a transmitting instrument having levers controlled by the movement of a perforated strip, and an oscillating member operated by the levers for completing and interrupting an electric circuit and spring-terminals adapted to engage with the oscillating member and complete the circuit, substantially as described.

3. In a system of telegraphy a transmitting instrument having an oscillating member 25, spring-terminals 28 29 adapted to engage therewith, adjusting-screws 30, for the purpose of adjusting the spring-terminals to the oscillating member, and means for operating the oscillating member.

4. In a system of telegraphy a transmitting instrument having levers, provided with springs adapted to hold the levers against a perforated strip, tension-screws adapted to adjust the springs, and an oscillating member operated by the levers for completing and interrupting an electric circuit.

5. In a system of telegraphy a transmitting instrument having a feed-wheel, adapted to engage with and advance a perforated strip, a spring 15 provided with holes 16, adapted to hold the strip in engagement with the feed-wheel, and a guide for directing the strip to the feed-wheel.

6. In a system of telegraphy a transmitting instrument having an electrically-driven feed-wheel adapted to engage with and advance a perforated strip, levers, provided with points adapted to enter perforations in the said strip, and be ejected by the strip, a roller provided with longitudinal channels having a web between them adapted to aid the strip in ejecting the points, and springs, adapted to hold the points against the strip and cause them to enter the said perforations and channels.

7. In a system of telegraphy, the combination of an electric motor, a feed-wheel driven thereby, a guide adapted to direct a perforated strip to the feed-wheel, means for holding the strip in engagement with the feed-wheel, an oscillating member adapted to engage with spring-terminals for the purpose of completing and interrupting an electric circuit, levers adapted to operate said oscillating member, said levers having points adapted to enter perforations in the strip and be ejected by the strip, for the purpose of allowing the said levers to operate the said oscillating member and be removed therefrom, and a roller in engagement with the feed-wheel and adapted to assist the strip in ejecting the said points, substantially as described.

8. In a system of telegraphy the combination of an electric motor, a transmitting instrument having a feed-wheel driven thereby, an oscillating member adapted to make and break an electric circuit, means adapted to operate the oscillating member and a secondary coil, substantially as and for the purposes described.

9. In a system of telegraphy a receiving and recording instrument having a permanent magnet, electromagnets, a vibrating arm magnetized by the permanent magnet, a pen attached to the said vibrating arm, adjusting-screws adapted to limit the movement of the pen, an arm adapted to receive and hold a strip against the pen, and means, as a screw and spring, for adjusting the arm to the pen.

10. In a system of telegraphy a receiving and recording instrument having an electrically-controlled vibrating arm with a pen attached thereto, an arm adapted to receive and hold a strip against the pen, rollers adapted to grip and advance the strip, means as an electric motor and gears, adapted to revolve the rollers, and electrically-controlled means for starting and stopping the motor.

11. In a system of telegraphy, a receiving and recording instrument having an electrically-controlled vibrating arm, a paper strip moved by rollers, operated by an electric motor, an electromagnet having an oscillating armature-piece adapted to complete the circuit of the electric motor, and means, as conducting wires and surfaces and an insulated point, whereby on the movement of the vibrating arm the circuit to the electromagnet will be completed and the magnet rendered operative.

12. In a system of telegraphy a receiving and recording instrument having an electrically-controlled vibrating arm, a paper strip moved by rollers, a roller extended to receive electric terminals, and a drive-wheel, means, as an electric motor, for rotating the drive-wheel, a terminal in contact with the extended roller, an electromagnet having an oscillating armature adapted to make contact with the extended roller and complete an electric circuit to the motor, and means, as the vibrating arm, for operating the electromagnet.

13. In a system of telegraphy a receiving and recording instrument having a marking device and a paper strip moved by rollers, a roller extended to receive electric terminals, means as an electric motor for rotating the roller, a terminal in contact with the extended roller, an electromagnet having an oscillating armature adapted to make contact with the extended roller and complete an electric circuit to the motor, and means as a pin in the extended roller, adapted to return the oscillating armature and break the circuit to the motor.

14. In a system of telegraphy, a receiving and recording instrument having a marking device and a paper strip moved by rollers, a roller extended to receive electric terminals, means operated electrically for rotating the roller, an electromagnet having an oscillating armature provided with a spring-terminal adapted to engage with the extended roller and a pin therein, and yield to the pin when current is flowing through the magnet and to return the armature when no current is flowing through the magnet, substantially as described.

15. In a system of telegraphy the combination in a receiving and recording instrument of an ink-well having an outlet therefrom, a lever adapted to normally close the outlet, a connecting-rod and eccentric adapted to move the lever and open the outlet, and means for operating the eccentric upon the recording of a message, substantially as described.

16. In a system of telegraphy the combination in a receiving and recording instrument of an ink-well having an outlet, an arm adapted to normally close the outlet, a connecting-rod and eccentric adapted to move the arm and open the outlet, and an air-vent, substantially as described.

17. In a system of telegraphy, the combination, in a receiving and recording instrument having a vibrating arm provided with a pen, of an ink-well having an outlet adapted to convey the ink to the pen, a valve for controlling the flow of the ink, a lever adapted to normally close the said outlet and means controlled by the vibrating arm adapted to move the lever and open the outlet substantially as described.

EDWIN R. STORM.

Witnesses:
PERCY JACOBS,
JAMES RAMSEY.